United States Patent
Kim et al.

(10) Patent No.: US 11,046,617 B2
(45) Date of Patent: Jun. 29, 2021

(54) TAPE CASTING SLURRY COMPOSITION FOR PREPARING SILICON NITRIDE SINTERED BODY

(71) Applicant: LG Chem, Ltd., Seoul (KR)

(72) Inventors: Jungyu Kim, Daejeon (KR); Dong Oh Shin, Daejeon (KR); Jung Min Ko, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/638,363

(22) PCT Filed: Sep. 19, 2018

(86) PCT No.: PCT/KR2018/011061
§ 371 (c)(1),
(2) Date: Feb. 11, 2020

(87) PCT Pub. No.: WO2019/059641
PCT Pub. Date: Mar. 28, 2019

(65) Prior Publication Data
US 2020/0165167 A1 May 28, 2020

(30) Foreign Application Priority Data

Sep. 20, 2017 (KR) ......................... 10-2017-0121477
Sep. 18, 2018 (KR) ......................... 10-2018-0111631

(51) Int. Cl.
| | | |
|---|---|---|
| *C04B 35/584* | (2006.01) | |
| *C04B 35/587* | (2006.01) | |
| *C04B 35/634* | (2006.01) | |
| *C04B 35/626* | (2006.01) | |
| *C04B 35/64* | (2006.01) | |
| *C04B 35/63* | (2006.01) | |

(52) U.S. Cl.
CPC ........ *C04B 35/584* (2013.01); *C04B 35/6261* (2013.01); *C04B 35/6264* (2013.01); *C04B 35/6303* (2013.01); *C04B 35/63424* (2013.01); *C04B 35/63456* (2013.01); *C04B 35/63488* (2013.01); *C04B 35/64* (2013.01); *C04B 2235/3206* (2013.01); *C04B 2235/3225* (2013.01); *C04B 2235/3878* (2013.01); *C04B 2235/3882* (2013.01); *C04B 2235/5409* (2013.01); *C04B 2235/6025* (2013.01); *C04B 2235/656* (2013.01); *C04B 2235/658* (2013.01)

(58) Field of Classification Search
CPC .. C04B 35/584; C04B 35/587; C04B 35/6264
See application file for complete search history.

(56) References Cited

U.S. PATENT DOCUMENTS

| | | | |
|---|---|---|---|
| 5,631,200 A | 5/1997 | Ukegawa et al. | |
| 5,691,261 A * | 11/1997 | Takahashi | ........... C04B 35/5935 501/97.2 |
| 5,804,521 A | 9/1998 | Takahashi et al. | |
| 6,846,765 B2 | 1/2005 | Imamura et al. | |
| 7,031,166 B2 | 4/2006 | Imamura et al. | |
| 9,440,887 B2 | 9/2016 | Funaki et al. | |
| 2002/0164475 A1 | 11/2002 | Imamura et al. | |
| 2005/0094381 A1 | 5/2005 | Imamura et al. | |
| 2007/0039680 A1 | 2/2007 | Kobayashi et al. | |
| 2011/0272187 A1 | 11/2011 | Kaga et al. | |
| 2015/0251957 A1 | 9/2015 | Funaki et al. | |

FOREIGN PATENT DOCUMENTS

| | | |
|---|---|---|
| CN | 1962545 A | 5/2007 |
| JP | H06219840 A | 8/1994 |
| JP | H09002878 A | 1/1997 |
| JP | 2005089199 A | 4/2005 |
| JP | 2009208981 A | 9/2009 |
| JP | 2011178598 A | 9/2011 |
| JP | 2011195395 A | 10/2011 |
| JP | 5544567 B2 | 7/2014 |
| JP | 5673106 B2 | 2/2015 |
| KR | 100435292 B1 | 6/2004 |
| KR | 20070103330 A | 10/2007 |
| KR | 100836150 B1 | 6/2008 |
| WO | 2010082478 A1 | 7/2010 |
| WO | 2014069268 A1 | 5/2014 |

OTHER PUBLICATIONS

Search Report from International Application No. PCT/KR2018/011061, dated Feb. 21, 2019.

* cited by examiner

*Primary Examiner* — Karl E Group
(74) *Attorney, Agent, or Firm* — Lerner, David, Littenberg, Krumholz & Mentlik, LLP

(57) ABSTRACT

A tape casting slurry composition for preparing a silicon nitride sintered body is provided. The tape casting slurry composition exhibits a viscosity suitable for tape casting, and thus, can easily control the area and thickness of the prepared green sheet, thereby preparing a large area silicon nitride sintered body having a thickness of a circuit board without post-processing processes such as grinding, and the like. Therefore, according to the present invention, a silicon nitride sintered body can be prepared using low cost raw materials by a simplified process, thereby securing efficiency and economic feasibility of the preparation process.

15 Claims, No Drawings

TAPE CASTING SLURRY COMPOSITION FOR PREPARING SILICON NITRIDE SINTERED BODY

CROSS-REFERENCE TO RELATED APPLICATIONS

The present application is a national phase entry under § 371 of International Application No. PCT/KR2018/011061, filed Sep. 19, 2018, which claims priority from Korean Patent Application No. 10-2017-0121477 filed on Sep. 20, 2017 and Korean Patent Application No. 10-2018-0111631 filed on Sep. 18, 2018, the disclosures of which are herein incorporated by reference in their entirety.

TECHNICAL FIELD

The present invention relates to a tape casting slurry composition for preparing a silicon nitride sintered body.

BACKGROUND ART

A power semiconductor device (hereinafter, referred to as a power device) refers to a semiconductor device that is mainly used for an inverter or a circuit, and is required for power switching, motor control, and the like. Since Thyristor was presented at 1957, with the development of power devices, power change and control using the same and power electronics industries applying the same have been remarkably developed. Recently, with the active movement for innovation and distribution of technology promoting change into cyclic society reusing resources and energy of earth, the functions of power electronics and the key components thereof, power devices, are becoming more and more important.

Commonly, since the electric power used in a power device is more than hundreds of Amperes and the voltage is high power in the range of hundreds of Volts, a temperature of heat generated from semiconductor is also very high. Thus, by such heat, deterioration and performance degradation of devices or malfunction and destruction may be generated. In order to prevent and overcome such phenomenon, effective heat release from a power device is required. Since ceramic material having both electric insulation and high thermal conductivity has very excellent heat radiation function for rapidly transferring and diffusing heat generated in the power device, it is used as material of substrate of the power device, material of a substrate for highly integrated circuit, heat sink in a laser heat radiation part, and the like. Although the ceramic material has excellent thermal and mechanical properties such as high strength, high heat resistance, and the like, poor sinterability, poor processability and fracture toughness are remarkably low, compared to other materials, and thus, the application has been limited.

Meanwhile, silicon nitride generally has flexural strength of 1,000 to 1,400 MPa, which is most excellent among ceramics, and low coefficient of thermal expansion of $3.2 \times 10^{-6}/K$, and thus, it can be applied at high temperature. And, it has density of about 3.2 $g/cm^3$, thermal conductivity of 30 to 178 $W/(m·K)$, and thermal shock resistance of 800 to 1000 K, and thus, is highly resistant to thermal shock and has large strength at high temperature, and is being spotlighted as novel heat sink.

Due to the above properties, it is known that a silicon nitride sintered body is used for a circuit board of a power semiconductor module. As the conventional preparation method of a silicon nitride sintered body, a method is known wherein a molded article is formed using α-phase silicon nitride powders by cold isostatic press(CIP), the molded article is sintered by hot isostatic pressure(HIP), and then, prepared into a circuit board thickness through grinding. However, since this method uses α-phase silicon nitride powders, raw material cost is high, post-processing processes such as grinding are required, and thus, the process is complicated and cost increases.

DISCLOSURE

Technical Problem

It is an object of the present invention to provide a tape casting slurry composition that can reduce raw material cost, and can prepare a silicon nitride sintered body having a thickness suitable for use in a thermal radiation board in a power device by a simplified preparation process compared to the existing process, without post-processing processes, and a method for preparing a silicon nitride sintered body using the same.

Technical Solution

In order to solve the problem, the present invention provides a tape casting slurry composition for preparing a silicon nitride sintered body, comprising 100 parts by weight of raw material powders comprising silicon nitride powders and sintering aid powders;
50 to 100 parts by weight of a solvent;
20 to 60 parts by weight of a binder; and
3 to 10 parts by weight of a dispersant;
wherein the silicon nitride powders comprise β-phase silicon nitride and α-phase silicon nitride at a weight ratio of 4:1 to 1:1, and
the solvent comprises two or more kinds of organic solvents having different polarity.

Preferably, the silicon nitride powders may comprise β-phase silicon nitride and α-phase silicon nitride at a weight ratio of 2.5:1 to 1:1.

The silicon nitride powders may have a specific surface area of 5 to 10 $m^2/g$.

The sintering aid powders may be included in the content of 1 to 15 parts by weight, based on 100 parts by weight of the silicon nitride powders.

The sintering aid may be one or more selected from the group consisting of magnesium oxide(MgO), yttrium oxide ($Y_2O_3$), gadolinium oxide($Gd_2O$), holmium oxide($Ho_2O_3$), erbium oxide($Er_2O_3$), ytterbium oxide($Yb_2O_3$), and dysprosium oixde($Dy_2O_3$).

The solvent may comprise
a first solvent comprising one or more selected from the group consisting of toluene, benzene, xylene and methylethylketone; and
a second solvent comprising one or more selected from the group consisting of propyleneglycol monomethylether acetate, propyleneglycol monomethylether, ethanol, butanol and methanol.

The binder may be an acryl-based binder.

The acryl-based binder may comprise about 5 to 60 wt % of (meth)acryl-based monomers having alkyl groups, and about 5 to 60 wt % of (meth)acryl-based monomers having nitrile groups.

The dispersant may be one or more selected from the group consisting of a polyester-based dispersant, a polyacrylate-based dispersant, a polyurethane-based dispersant, and a polyether-based dispersant.

The tape casting slurry composition of the present invention may further comprise a plasticizer.

The plasticizer may be included in the content of 1 to 40 wt %, based on 100 wt % of the binder.

The plasticizer may be one or more selected from the group consisting of di-2-ethylhexyl phthalate, di-normal-butyl phthalate, butyl phthalyl butyl glycolate, and dioctyl phthalate.

Total content of the silicon nitride powders and sintering aid powders included in the composition may be 30 to 60 wt %.

The viscosity of the composition at 25° C. may be 100 to 1000 cP.

And, the present invention provides a method for preparing a silicon nitride sintered body, comprising:

preparing a tape casting slurry composition comprising silicon nitride powders;

molding the composition to prepare a green sheet;

primarily heat treating the green sheet to degrease; and secondarily heat treating the degreased green sheet to sinter, wherein the tape casting slurry composition is the above-explained tape casting slurry composition of the present invention.

Effect of the Invention

The slurry composition of the present invention exhibits a viscosity suitable for tape casting, and thus, can easily control the area and thickness of the prepared green sheet, thereby preparing a large area silicon nitride sintered body having a thickness of a circuit board without post-processing processes such as grinding, and the like. And, according to the present invention, a silicon nitride sintered body can be prepared using low cost raw materials by a simplified process, thereby securing efficiency and economic feasibility of the preparation process.

BEST MODE

The terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, the present invention will be explained in detail.

The present invention provides a tape casting slurry composition for preparing a silicon nitride sintered body, comprising 100 parts by weight of raw material powders comprising silicon nitride powders and sintering aid powders;

50 to 100 parts by weight of a solvent;

20 to 60 parts by weight of a binder; and 3 to 10 parts by weight of a dispersant;

wherein the silicon nitride powders comprise β-phase silicon nitride and α-phase silicon nitride at a weight ratio of 4:1 to 1:1, and the solvent comprises two or more kinds of organic solvents having different polarity.

Since the slurry composition of the present invention uses β-phase silicon nitride and α-phase silicon nitride in combination at a specific ratio, a silicon nitride sintered body having excellent properties can be prepared.

And, since the slurry composition of the present invention has the above described composition, it may form a viscosity suitable for tape casting. Thus, if the composition is used, the area and thickness of the prepared green sheet can be easily controlled, and silicon nitride sintered body having a large area and a thickness of a circuit board can be prepared by a simple process without post-processing processes such as grinding, and the like.

In the present invention as the silicon nitride powders included in the raw material powders, β-phase silicon nitride (β-$Si_3N_4$) is mainly used, and α-phase silicon nitride(α-$Si_3N_4$) is added above a certain rate. Wherein, it is preferable that the β-phase silicon nitride is 100% β-phase, and the α-phase silicon nitride is 95% or more α-phase.

Silicon nitride exists as amorphous, crystalloid at room temperature, and the crystalloid is classified into α-phase and β-phase according to the crystal phase. Among them, α-phase silicon nitride has high sinterability, and during sintering, phase transition from α-type to β-type occurs to become a structure with grown cylindrical crystals, thus exhibiting the effect of improving strength and toughness. Thus, in the preparation of silicon nitride sintered body, silicon nitride powders having α-phase silicon nitride content of 90 wt % or more was commonly used. However, since the α-phase silicon nitride powder has high unit cost, it increases production cost.

The present invention intends to improve economical feasibility of the process while maintaining excellent properties of the silicon nitride sintered body, by using β-phase silicon nitride powders that are inexpensive compared to α-phase silicon nitride.

Previously, β-phase silicon nitride powder was not commonly used as the raw material of a silicon nitride sintered body because the particles are coarse and it is difficult to prepare a high strength sintered body. During the studies on a method capable of preparing excellent silicon nitride sintered body using β-phase silicon nitride powders as raw materials, the present inventors found out that if α-phase silicon nitride is added in a small quantity, shrinkage during sintering may be low, binding with crystals and compactness may be improved, and defects of grain boundary phase may be remarkably decreased. Such effects may be exhibited when the weight ratio of β-phase and α-phase silicon nitride is in the range of 4:1 to 1:1. Particularly, it was confirmed that when the weight ratio of β-phase and α-phase silicon nitride fulfills the range of 2.5:1 to 1:1, shrinkage of the sintered body is low, and external defects is generated less, and more excellent properties are exhibited in the range of 2:1 to 1:1.

In the present invention, the α-phase and β-phase silicon nitride powders have average particle size(D50) of 1 μm or less, more specifically, 0.5 to 1 μm. When the average particle size of the silicon nitride powders fulfills the above range, they can be easily dispersed during the preparation of a slurry composition, and can make the surface roughness of the prepared sintered body uniform.

Specifically, if the average particle size(D50) of the silicon nitride powders is greater than 1 μm, the surface uniformity of a green sheet may be lowered during tape casting of a slurry composition, and if it is less than 0.5 μm, they cannot be uniformly dispersed in the slurry composition, and agglomeration of the powders may be caused, and thus, a dispersant, a binder, a solvent, and the like should be used in excessive amounts for uniform dispersion. Thus, it is preferable that the average particle size of the silicon nitride powders fulfills the above range.

And, it is more preferable that the silicon nitride powders has D90 value of 1.5 μm or less, while fulfilling the above average particle size(D50) range.

Wherein, the D50 and D90 mean particle sizes at the points where cumulative volumes respectively reach 50% and 90%, and particle size analysis may be conducted using a laser scattering particle size analyzer. Namely, D50 of 1 μm means that 50% of particles have a particle size of 1 μm or less.

In the present invention, it is preferable that the α-phase and β-phase silicon nitride powders have average particle size(D50) of 1 μm or less, and specific surface area of 5 to 10 $m^2/g$, more specifically 7 to 8.5 $m^2/g$. When the above ranges are fulfilled, formability and sinterability of a green sheet may be improved.

It is preferable that the content of impurities is less than 1.5 wt %, based on 100 wt % of the silicon nitride powders. Specifically, it is preferable that among the silicon nitride powders, the content of iron(Fe) is 0.002 to 0.2 wt %, the content of aluminum(Al) is 0.01 to 0.1 wt %, and the content of calcium(Ca) is less than 0.1 wt %.

Silicon nitride is poor sinterable material that is difficult to self-diffuse due to strong covalent bond, and of which sintering temperature is limited due to thermal decomposition at high temperature. Thus, the raw material powders of the present invention comprise sintering aid powders in addition to the silicon nitride powders, so as to decrease a sintering temperature and scavenge oxygen, and the like, thereby improving the properties of a sintered body.

As the sintering aid, those known to be capable of securing the above explained effects in the art may be appropriately used. However, in case a silicon nitride sintered body for thermal radiation board comprises sialon (SiAlON), heat dissipation characteristics may be lowered, and thus, preferably, aluminum oxide($Al_2O_3$) is not used.

Specifically, as the sintering aid, rare earth element oxide, alkali earth metal oxide and combinations thereof may be used, and more specifically, one or more selected from the group consisting of magnesium oxide(MgO), yttrium oxide ($Y_2O_3$), gadolinium oxide($Gd_2O$), holmium oxide($Ho_2O_3$), erbium oxide($Er_2O_3$), ytterbium oxide($Yb_2O_3$), and dysprosium oixde($Dy_2O_3$) may be used. Preferably, as the sintering aid, a mixture of magnesium oxide and yttrium oxide may be used, and the mixing weight ratio thereof is preferably 2:5 to 3:5.

Wherein, the sintering aid powders may be included in the content of 1 to 15 parts by weight, preferably 7 to 10 parts by weight, based on 100 parts by weight of the silicon nitride powders, so as to improve sinterability of a silicon nitride sintered body. If the content of the sintering aid powders is excessively high, thermal conductivity of the finally prepared silicon nitride sintered body may be deteriorated, and thus, the content may be appropriately controlled within the above range.

The tape casting slurry composition of the present invention comprises a solvent, a binder and a dispersant, together with the above raw material powders.

As the solvent, solvents that can disperse the raw material powders, binder and dispersant, and can be evaporated later during the processes of degreasing and sintering of a green sheet prepared from the slurry composition, may be used.

In case β-phase and α-phase silicon nitride are mixed to prepare a slurry composition, due to surface charges difference, aggregation may easily occur. Thus, it is very important to select a solvent so that the silicon nitride powders may be stably dispersed without aggregation.

In the present invention, in order to overcome such a problem, two kinds of organic solvents having different polarity are used. Specifically, it is preferable that a first solvent having low polarity and a second solvent having relatively high polarity are used in combination according to the mixing ratio of β-phase and α-phase silicon nitride powders. Wherein, as the first solvent, one or more selected from group consisting of toluene, benzene, xylene and methylethylketone(MEK) may be used, and as the second solvent, one or more second selected from the group consisting of propyleneglycol monomethylether acetate(PGMEA), propyleneglycol monomethylether(PGME), ethanol, butanol and methanol may be used.

The content ratio of the first solvent and the second solvent may be adjusted according to the content of α-phase silicon nitride included in the composition. Preferably, the content ratio may be adjusted so that the first solvent and the second solvent may be mixed to form an azeotrope.

Preferably, as the solvent, a mixture of toluene and PGMEA, or toluene and ethanol at a volume ratio of 4:1 to 1:1 may be used, and specifically, a 8:2 mixture, a 7:3 mixture, a 6:4 mixture, a 5:5 mixture, and the like may be used.

The content of the solvents in the composition may be preferably 50 to 100 parts by weight, or 60 to 80 parts by weight, based on 100 parts by weight of the raw material powders. If the content of the solvents is greater than 100 parts by weight, based on 100 parts by weight of the raw material powders, the viscosity of the slurry composition may excessively decrease, making it unsuitable for tape casting, and if it is less than 50 parts by weight, it may be difficult to uniformly mix raw materials, and powders may excessively increase and cannot be prepared into a slurry, and thus, the content may be appropriately adjusted within the above range.

In the present invention, the binder is added to prevent cracking during green sheet forming, degreasing and sintering processes and increase bonding force between raw materials, and preferably, a polymer binder is used. Particularly, it is appropriate to use an acryl-based binder as the polymer binder so as to prevent cracking of a sintered body and improve strength.

Specifically, the acryl-based binder may be polymer of monomer mixture comprising about 5 to 60 wt % of (meth) acrylate-based monomers having alkyl groups and about 5 to 60 wt % of (meth)acryl-based monomers having nitrile groups.

In order to secure the effects, it is preferable that the binder is included in the content of 20 to 60 parts by weight, or 30 to 40 parts by weight, based on 100 parts by weight of raw material powders.

The dispersant is added to inhibit aggregation of raw material powders, and appropriately control the viscosity of the slurry composition. In order to secure such effects, the content of the dispersant may be appropriately 3 to 10 parts by weight, more appropriately, 5 to 7 parts by weight, based on 100 parts by weight of raw material powders.

In the present invention, the kind of the dispersant is not specifically limited, but one or more selected from the group consisting of polyester-based dispersant, polyacrylate-based dispersant, polyurethane-based dispersant, and polyether-based dispersant may be used.

Meanwhile, the tape casting slurry composition of the present invention may further comprise a plasticizer. The plasticizer is added to decrease glass transition temperature of the binder, thus improving handling property of the prepared green sheet. The amount of the plasticizer may be controlled according to the kind of binder used, and the content of polymer included in the binder. Specifically, the plasticizer may be preferably included in the content of 1 to 40 wt %, more preferably 5 to 15 wt %, based on 100 wt % of the binder.

The kind of the plasticizer may be appropriately selected according to the kind of a binder used, and for example, one or more selected from the group consisting of di-2-ethyl-hexyl phthalate, di-normal-butyl phthalate, butyl phthalyl butyl glycolate, and dioctyl phthalate may be used.

In the tape casting slurry composition of the present invention, total contents of solid raw materials, namely silicon nitride powders and sintering aid powders may be preferably 30 to 60 wt %, more preferably 50 to 60 wt %, based on 100 wt % of the total composition. When the solid contents in the slurry composition fulfills the above range, appropriate viscosity may be secured, and after tape casting, lamination of a green sheet may be facilitated. And, since high sintered density may be obtained during sintering of a green sheet, the prepared sintered body may have high thermal conductivity.

The slurry composition of the present invention fulfilling the above explained composition may have viscosity at 25° C. of 100 to 1000 cP, preferably 200 to 600 cP. If the viscosity is less than the above range, formability may be lowered during the preparation process of a green sheet, and if it exceeds the above range, it may be difficult to control the thickness of a green sheet to a desired range. In the present invention, by using 100% β-phase silicon nitride powders and 95% α-phase silicon nitride powders in combination as silicon nitride raw materials, and comprising a solvent, a binder and a dispersant in specific ranges, the viscosity of a slurry composition suitable for tape casting may be realized.

Meanwhile, the present invention provides a method for preparing a silicon nitride sintered body using the slurry composition.

Specifically, the preparation method comprises steps of:
preparing a tape casting slurry composition comprising silicon nitride powders;
molding the composition to prepare a green sheet;
primarily heat treating the green sheet to degrease; and
secondarily heat treating the degreased green sheet to sinter,
wherein as the tape casting slurry composition, the above explained composition of the present invention is used.

In the step of preparing the tape casting slurry composition, raw material powders, a solvent, a binder, a dispersant and a plasticizer are uniformly mixed to prepare a slurry, and the step may be conducted using commonly used wet mixers such as a ball-mill, attritor, and the like.

Preferably, the step of preparing a slurry composition may be conducted by a ball-mill. Wherein, ball-milling time and speed may be adjusted according to the composition of the raw material powders, and the kind and amount of added organic substances such as binder, dispersant, and the like, and for example, ball milling may be conducted at room temperature(25° C.) at 250 rpm for 3 to 8 hours, using 100 to 200 g of zirconia balls having a diameter of 5 to 10 mm, to prepare a slurry composition.

The step of preparing a green sheet may be conducted by doctor blades, and the thickness of the prepared green sheet may be controlled by controlling the intervals of doctor blades. Wherein, in order to facilitate forming, it is preferable to control the viscosity of the slurry composition according to the thickness of a green sheet. For example, in case a thin green sheet with a thickness of 0.2 to 0.5 mm is formed, it is preferable that the viscosity of the slurry composition at 25° C. is controlled to a range of 250-350 cP, and in case a thick green sheet with a thickness of 1 to 3 mm is formed, it is preferable that the viscosity of the slurry composition at 25° C. is controlled to a range of 450 to 550 cP.

In order to obtain silicon nitride sintered body with an appropriate thickness, the green sheet may be used in a monolayer, or plural sheets may be laminated. In case plural green sheets are laminated, in order to minimize interface between layers and improve interlayer adhesion, a lamination process may be further conducted before the degreasing step. Wherein, although the process conditions are not specifically limited, the lamination step may be conducted by pressing at a temperature of 70 to 110° C. using a common laminator.

After preparing a green sheet as explained above, a degreasing process is conducted so as to remove organic materials and carbon such as a solvent, binder, dispersant, plasticizer, and the like included in the green sheet.

The degreasing process may be conducted by heat treating under air or nitrogen atmosphere, and the heat treatment temperature may be preferably in the range of 400 to 700° C., or 550 to 650° C., and the heat treatment time may be preferably 6 to 9 hours.

The degreased green sheet is subjected to secondary heat treatment to finally obtain a silicon nitride sintered body. The sintering step is conducted by gas pressure sintering (GPS), and it may be preferably conducted at a gas pressure sintering furnace temperature of 1600 to 2000° C., preferably 1850 to 1900° C., under nitrogen atmosphere and 8 to 10 atm conditions.

According to the above preparation method, a silicon nitride sintered body with an appropriate thickness can be prepared without post-processing processes such as grinding, and thus, a sintered body having a form suitable for the application in a powder device can be obtained by a simplified process. And, by using 100% β-phase silicon nitride powders as main raw material, cost saving effect may be obtained, and by adding 95% α-phase silicon nitride powders in a small amount, crystal binding and compactness may be improved during sintering. Thus, according to the present invention, while maintaining excellent properties of a silicon nitride sintered body, the efficiency and economical feasibility of the preparation process can be secured.

Hereinafter, preferable examples are presented for better understanding of the present invention, but the following examples are presented only as the illustrations of the present invention, it is obvious to one of ordinary knowledge the art that various modifications and alterations can be made within the categories and technical ideas of the present invention, and that such modifications and alterations are within the claims attached hereto.

EXAMPLE

Examples 1 to 5 and Comparative Example 1

Using mixed powders comprising silicon nitride powders having a specific surface area of 7.43 m²/g and consisting of 100% β-phase, and silicon nitride powders having a specific surface area of 8.27 m²/g and consisting of 95% α-phase at a weight ratio described in the following Table 1 as raw materials, a tape casting slurry composition was prepared by the following method, and a silicon nitride sintered body was prepared using the same.

(1) Preparation of a Tape Casting Slurry Composition

To 100 parts by weight of the mixed powders of β-phase and α-phase silicon nitride powders, 2 parts by weight of magnesium oxide(MgO) and 5 parts by weight of yttrium oxide($Y_2O_3$) were added as sintering aids, and the mixture was used as raw material powders. And, as a binder, SOKEN LPR001, as a dispersant, DISPERBYK-112, and as a plasticizer, di-normal-butyl phthalate were used.

To 100 parts by weight of the raw material powders, 50 parts by weight of a 7:3 mixed solvent of toluene and PGMEA, 30 parts by weight of the binder, 5 parts by weight of the dispersant, and 4 parts by weight of the plasticizer were added, and mixed. And then, the mixture was ball-milled at 250 rpm for 4 hours, using 50 g of zirconia($ZrO_2$) balls(Φ=5 mm), to prepare a tape casting slurry composition. The viscosities of the slurry compositions of Examples 1 to 5 at 25° C. were measured to be 200 to 1000 cP.

(2) Preparation of a Silicon Nitride Sintered Body

The slurry composition obtained in (1) was formed with doctor blade to prepare a green sheet having a thickness of 0.2 mm.

The green sheet was heat treated at 550 to 600° C. under nitrogen atmosphere, to conduct a degreasing process of removing organic substances and carbon in the green sheet. And then, the green sheet was heat treated and sintered at 1850 to 1900° C., under nitrogen atmosphere and 8 to 10 atm, using GPS equipment, to prepare a silicon nitride sintered body.

In order to examine the degree of shrinkage of each silicon nitride sintered body prepared above, the area of the green sheet and the area of the finally prepared silicon nitride sintered body were compared and shrinkage was calculated according to the following Equation 1.

$$\Delta d/dI \times 100(\%)(\Delta d = \text{area of green sheet before sintering} - \text{area of silicon nitride sintered body after sintering}, dI = \text{area of green sheet before sintering})$$
Equation 1

And, the external defects of the sintered body was confirmed with an unaided eye using an optical microscope, Scanning Electron Microscope(SEM), and the like, and if the number of pin holes per 1 mm² is 0, it was evaluated as being good, if the number of pin holes is 1, evaluated as average, and if the number of pin holes is greater than 1, evaluated as bad; and in the case of cracks, if there is only one crack, it was evaluated as bad. The results were summarized in the following Table 1.

Referring to Table 1, it can be confirmed that when the mixing ratio of β-phase and α-phase silicon nitride fulfills the range of the present invention, a silicon nitride sintered body having low shrinkage and less external defects can be prepared.

TABLE 1

| | silicon nitride weight ratio | | Shrinkage of green | External defects of |
|---|---|---|---|---|
| | α - phase | β - phase | sheet (%) | sintered body |
| Example 1 | 1 | 1 | 10 | ○ |
| Example 2 | 1 | 1.5 | 12 | ○ |
| Example 3 | 1 | 2 | 14 | ○ |
| Example 4 | 1 | 2.3 | 15 | ○ |
| Example 5 | 1 | 2.5 | 16 | ○ |
| Comparative Example 1 | 1 | 5 | 25 | X |

\* ○: good
Δ: average
X: bad

Comparative Example 2

Using mixed powders comprising silicon nitride powders having a specific surface area of 7.43 m²/g and consisting of 100% β-phase, and silicon nitride powders having a specific surface area of 8.27 m²/g and consisting of 95% α-phase at a weight ratio of 6:4 as raw materials, a tape casting slurry composition was prepared by the following method.

To 100 parts by weight of the mixed powders of β-phase and α-phase silicon nitride powders, 2 parts by weight of magnesium oxide(MgO) and 5 parts by weight of yttrium oxide($Y_2O_3$) were added as sintering aids, and the mixture was used as raw material powders.

To 100 parts by weight of the raw material powders, 50 parts by weight of a toluene solvent, 30 parts by weight of a binder, 5 parts by weight of a dispersant, and 4 parts by weight of a plasticizer were added, and mixed. And then, the mixture was ball-milled at 250 rpm for 4 hours, using 50 g of zirconia($ZrO_2$) balls(Φ=5 mm), to prepare a tape casting slurry composition.

The viscosity of the prepared slurry composition at 25° C. was measured to be 2000 cP.

Since the viscosity of the slurry composition using toluene alone as a solvent was too high, it could not be formed using doctor blade, and thus, a green sheet could not be prepared.

It can be confirmed from Examples and Comparative Examples that the slurry composition fulfilling the composition of the present invention exhibit viscosity suitable for tape casting, and thus, the area and thickness of the prepared green sheet can be easily controlled, and a silicon nitride sintered body having a large area and a thickness of a circuit board can be prepared by a simple process without post-processing processes such as grinding, and the like. And, it can be seen that since the slurry composition of the present invention comprises β-phase and α-phase silicon nitride at a predetermined mixing ratio, it exhibits excellent sinterability.

The invention claimed is:
1. A tape casting slurry composition for preparing a silicon nitride sintered body, comprising:
   100 parts by weight of raw material powders comprising silicon nitride powders and sintering aid powders;
   50 to 100 parts by weight of a solvent;
   20 to 60 parts by weight of a binder; and
   3 to 10 parts by weight of a dispersant;
   wherein the silicon nitride powders comprise β-phase silicon nitride and α-phase silicon nitride at a weight ratio of 4:1 to 1:1, and the solvent comprises two or more kinds of organic solvents having different polarity.

2. The tape casting slurry composition according to claim 1, wherein the silicon nitride powders comprise β-phase silicon nitride and α-phase silicon nitride at a weight ratio of 2.5:1 to 1:1.

3. The tape casting slurry composition according to claim 1, wherein the silicon nitride powders have a specific surface area of 5 m$^2$/g to 10 m$^2$/g.

4. The tape casting slurry composition according to claim 1, wherein the sintering aid powders are included in the content of 1 parts by weight to 15 parts by weight, based on 100 parts by weight of the silicon nitride powders.

5. The tape casting slurry composition according to claim 1, wherein the sintering aid is one or more selected from the group consisting of magnesium oxide(MgO), yttrium oxide ($Y_2O_3$), gadolinium oxide($Gd_2O$), holmium oxide($Ho_2O_3$), erbium oxide($Er_2O_3$), ytterbium oxide($Yb_2O_3$), and dysprosium oixde($Dy_2O_3$).

6. The tape casting slurry composition according to claim 1, wherein the solvent comprises
a first solvent comprising one or more selected from the group consisting of toluene, benzene, xylene and methylethylketone; and
a second solvent comprising one or more selected from the group consisting of propyleneglycol monomethylether acetate, propyleneglycol monomethylether, ethanol, butanol and methanol.

7. The tape casting slurry composition according to claim 1, wherein the binder is an acryl-based binder.

8. The tape casting slurry composition according to claim 7, wherein the acryl-based binder comprises about 5 wt % to 60 wt % of (meth)acryl-based monomers having alkyl groups, and about 5 wt % to 60 wt % of (meth)acryl-based monomers having nitrile groups.

9. The tape casting slurry composition according to claim 7, wherein the dispersant is one or more selected from the group consisting of a polyester-based dispersant, a polyacrylate-based dispersant, a polyurethane-based dispersant, and a polyether-based dispersant.

10. The tape casting slurry composition according to claim 1, further comprising a plasticizer.

11. The tape casting slurry composition according to claim 10, wherein the plasticizer is included in the content of 1 wt % to 40 wt %, based on 100 wt % of the binder.

12. The tape casting slurry composition according to claim 10, wherein the plasticizer is one or more selected from the group consisting of di-2-ethylhexyl phthalate, di-normal-butyl phthalate, butyl phthalyl butyl glycolate, and dioctyl phthalate.

13. The tape casting slurry composition according to claim 1, wherein total content of the silicon nitride powders and sintering aid powders included in the composition is 30 wt % to 60 wt %.

14. The tape casting slurry composition according to claim 1, wherein viscosity of the composition at 25° C. is 100 cP to 1000 cP.

15. A method for preparing a silicon nitride sintered body, comprising:
preparing a tape casting slurry composition comprising silicon nitride powders;
molding the composition to prepare a green sheet;
primarily heat treating the green sheet to degrease; and
secondarily heat treating the degreased green sheet to sinter,
wherein the tape casting slurry composition is the composition according to claim 1.

* * * * *